(12) United States Patent
Yuan (10) Patent No.: US 11,235,705 B1
(45) Date of Patent: Feb. 1, 2022

(54) REAR-VIEW MIRROR ASSEMBLY

(71) Applicant: Huizhou Kunbo Industrial Co., Ltd., Huizhou (CN)

(72) Inventor: Ruifeng Yuan, Huizhou (CN)

(73) Assignee: Huizhou Kunbo Industrial Co., Ltd., Huizhou (CN)

( * ) Notice: Subject to any disclaimer, the term of this patent is extended or adjusted under 35 U.S.C. 154(b) by 0 days.

(21) Appl. No.: 17/394,519

(22) Filed: Aug. 5, 2021

(51) Int. Cl.
*B60R 1/078* (2006.01)
*B60R 1/076* (2006.01)
*B62K 5/01* (2013.01)

(52) U.S. Cl.
CPC .............. *B60R 1/076* (2013.01); *B60R 1/078* (2013.01); *B62K 5/01* (2013.01); *B60Y 2200/124* (2013.01)

(58) Field of Classification Search
CPC ........... B60R 1/076; B60R 1/078; B60R 1/06; B60R 1/0605; B60R 11/00; B60R 2011/004; B60R 2011/0052; B60R 1/02; B60R 2011/0059; B62K 5/01; B60Y 2200/124
USPC ........................................................ 359/841
See application file for complete search history.

(56) References Cited

U.S. PATENT DOCUMENTS 6,286,968 B1 * 9/2001 Sailer .................... B60R 1/0617
248/478
2014/0153123 A1 * 6/2014 Hancock .................. B60R 1/06
359/872

* cited by examiner

*Primary Examiner* — Jade R Chwasz
(74) *Attorney, Agent, or Firm* — Rumit Ranjit Kanakia (57) ABSTRACT

A bracket assembly for mounting a mirror is provided. The bracket assembly includes a mirror clamp part, a base support part, and a frame clamp part. The mirror clamp part includes a dome connecting surface engageable with a socket of the mirror to allow rotation of the mirror. The mirror clamp part also includes a first engaging surface having a plurality of first teeth. The bracket assembly also includes a disk member having a plurality of second teeth engageable with the first teeth to allow rotation of the mirror clamp part. The disk member is also coupled to the to the base support part. The frame clamp part is slidable with respect to the base support part for changing a frame receiving opening. The bracket assembly further includes a first tightening mechanism and a second tightening mechanism to selectively vary an impact force required to rotate the mirror.

19 Claims, 6 Drawing Sheets

REAR-VIEW MIRROR ASSEMBLY

TECHNICAL FIELD

The present disclosure relates, in general, to rear-view mirrors of off-road vehicles, and more specifically relates, to a bracket assembly for robustly and pivotally mounting the rear view-mirror to the off-road vehicle.

BACKGROUND

Off-road vehicles, such as All-Terrain Vehicles (ATV) and Utility Task Vehicles (UTV) are used to carry one or more passengers and/or cargo over different types of terrains. Off-road vehicles are provided with rear view mirrors for facilitating vision toward a rear of the vehicle. The rear-view mirrors are typically mounted onto the vehicle using a bracket assembly attached to a frame of the vehicle. The bracket assembly generally includes a support arm clamped to the frame and hinges for pivotally connecting the rear-view mirror to the support arms. The bracket assembly provides flexibility in allowing positional adjustment of the rear-view mirror for optimum vision.

During operation of the vehicle, the bracket assembly is subjected to continual loads which causes the mirror to vibrate, especially when the vehicle is travelling over rough terrain. These vibrations potentially reduce the usefulness as well as the lifespan of the mirror. Moreover, the bracket assemblies are often collided with structural members, such as poles, trees, bushes, etc., and other vehicles, which may lead to detachment or falling of the mirror from the vehicle.

Accordingly, the brackets need to be robust enough to withstand high loads and flexible enough to allow positional adjustment of the mirror. With recreational interests, new models and makes of off-road vehicles are entering the marketplace with new driving experiences and/or new aesthetics. Existing bracket assemblies are thus rendered obsolete, if the brackets fail to accommodate the changing requirements of new models and make. This may lead to increased material waste which may be difficult for recycling or disposal.

SUMMARY

According to one aspect of the present disclosure, a bracket assembly for mounting a mirror to a column is provided. The bracket assembly includes a mirror clamp part having a dome connecting surface along a vertical axis and a first engaging surface along a central axis perpendicular to the vertical axis. The first engaging surface includes a plurality of first teeth angularly spaced from each other about the central axis. The bracket assembly includes a base support part adapted to couple with the mirror clamp part. The base support part has a second engaging surface extending along the central axis and a first curvilinear surface opposite to the second engaging surface. The second engaging surface includes a plurality of projections angularly spaced from each other about the central axis. The bracket assembly includes a disk member having a plurality of channels configured to receive the projections of the second engaging surface to fixedly couple with the base support part. The disk member includes plurality of second teeth angularly spaced from each other about the central axis. The bracket assembly includes a frame clamp part configured to be coupled with the base support part. The frame clamp part has a second curvilinear surface facing the first curvilinear surface of the base support part to define an opening for receiving the column. The dome connecting surface is adapted to be received within a socket of the mirror to allow a rotation of the mirror about the vertical axis. The plurality of first teeth is adapted to engage with the plurality of second teeth to a allow rotation of the mirror about the central axis. The frame clamp part is translatable along the central axis with respect to the base support part to change a diameter of the opening for receiving the column.

According to another aspect of the present disclosure, a rear-view mirror assembly for a vehicle is provided. The rear-view mirror assembly includes a mirror shell defining a socket. The rear-view mirror assembly includes a mirror clamp part having a dome connecting surface along a vertical axis and a first engaging surface along a central axis perpendicular to the vertical axis. The first engaging surface includes a plurality of first teeth. The dome connecting surface engages with the socket of the mirror shell to allow rotation of the mirror shell about the vertical axis. The rear-view mirror assembly includes a base support part adapted to couple with the mirror clamp part. The base support part has a second engaging surface extending along the central axis and a first curvilinear surface opposite to the second engaging surface. The second engaging surface includes a plurality of projections angularly spaced from each other about the central axis. The rear-view mirror assembly includes a disk member having a defining a plurality of channels to receive the projections of the second engaging surface to couple with the base support part. The disk member includes a plurality of second teeth engageable with the plurality of first teeth of the first engaging surface to allow rotation of the mirror clamp part about the vertical axis. The rear-view mirror assembly includes a first tightening mechanism for selectively varying an impact force required to rotate the mirror about the vertical axis. The first tightening mechanism includes a first bolt configured to couple the mirror clamp part with the mirror. The first tightening mechanism includes a first locking nut configured to secure the first bolt to the mirror clamp part. The first tightening mechanism includes a first biasing member disposed between the nut and the mirror clamp part to bias the dome connecting surface into engagement with the socket of the mirror. A biasing force of the first biasing member is adjusted by rotating the first locking nut on the first bolt to vary the impact force.

The rear-view mirror assembly includes a second tightening mechanism for selectively varying an impact force required to rotate the mirror claiming member about the horizontal axis. The second tightening mechanism includes a second bolt configured to couple the mirror clamp part with the disk member and the base support part. The second tightening mechanism includes a second locking nut configured to secure the second bolt to the base support part. The second tightening mechanism includes a second biasing member disposed between the second bolt and the base support part. The second biasing member is configured to bias the plurality of first teeth of the first engaging surface out of the mesh engagement with the plurality of second teeth of the disk member. A biasing force of the second biasing member is adjusted by rotating the second bolt into the second through hole to selectively vary the impact force required to rotate the mirror claiming member about the horizontal axis. The rear-view mirror assembly includes a frame clamp part configured to be coupled with the base support part. The frame clamp part has a second curvilinear surface facing the first curvilinear surface of the base support part to define an opening for receiving the frame. The frame clamp part is translatable along the central axis with respect to the base support part to change a diameter of the opening for receiving a column of the vehicle.

According to yet another aspect of the present disclosure, An off-road vehicle is provided. The off-road vehicle includes a frame having a column and a mirror shell defining a socket. The off-road also includes a bracket assembly for pivotally and rigidly mounting the mirror shell to the column of the frame. The bracket assembly includes a mirror clamp part having a dome connecting surface along a vertical axis and a first engaging surface along a central axis perpendicular to the vertical axis. The first engaging surface includes a plurality of first teeth. The dome connecting surface engages with the socket of the mirror shell to allow rotation of the mirror shell about the vertical axis. The bracket assembly includes a base support part adapted to couple with the mirror clamp part. The base support part has a second engaging surface extending along the central axis and a first curvilinear surface opposite to the second engaging surface. The second engaging surface includes a plurality of projections angularly spaced from each other about the central axis. The bracket assembly includes a disk member having a defining a plurality of channels to receive the projections of the second engaging surface to couple with the base support part. The disk member includes a plurality of second teeth engageable with the plurality of first teeth of the first engaging surface to allow rotation of the mirror clamp part about the vertical axis.

The bracket assembly includes a first tightening mechanism for selectively varying an impact force required to rotate the mirror about the vertical axis. The first tightening mechanism includes a first bolt configured to couple the mirror clamp part with the mirror, a first locking nut configured to secure the first bolt to the mirror clamp part; and a first biasing member disposed between the nut and the mirror clamp part to bias the dome connecting surface into engagement with the socket of the mirror. A biasing force of the first biasing member is adjusted by rotating the first locking nut on the first bolt to vary the impact force. The bracket assembly further includes a second tightening mechanism for selectively varying an impact force required to rotate the mirror claiming member about the horizontal axis. The second tightening mechanism includes a second bolt configured to couple the mirror clamp part with the disk member and the base support part. The second tightening mechanism includes a second locking nut configured to secure the second bolt to the base support part. The second tightening mechanism includes a second biasing member disposed between the second bolt and the base support part. The second biasing member is configured to bias the plurality of first teeth of the first engaging surface out of the mesh engagement with the plurality of second teeth of the disk member. A biasing force of the second biasing member is adjusted by rotating the second bolt into the second through hole to selectively vary the impact force required to rotate the mirror claiming member about the horizontal axis.

The bracket assembly further includes a frame clamp part configured to be coupled with the base support part. The frame clamp part has a second curvilinear surface facing the first curvilinear surface of the base support part to define an opening for receiving the frame. The frame clamp part is translatable along the central axis with respect to the base support part to change a diameter of the opening for receiving a column of the vehicle.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Aspects of the present disclosure are directed to a bracket assembly that can be used for pivotally mounting rear-view mirrors to different makes and models of off-road vehicles. The bracket assembly has robust structural components that are coupled together through tightening assemblies for selectively varying impact forces required to rotate the mirror, thereby absorbing vibrational forces and high impact forces generated in different driving conditions and/or applications of the off-road vehicles.

Figure 1:
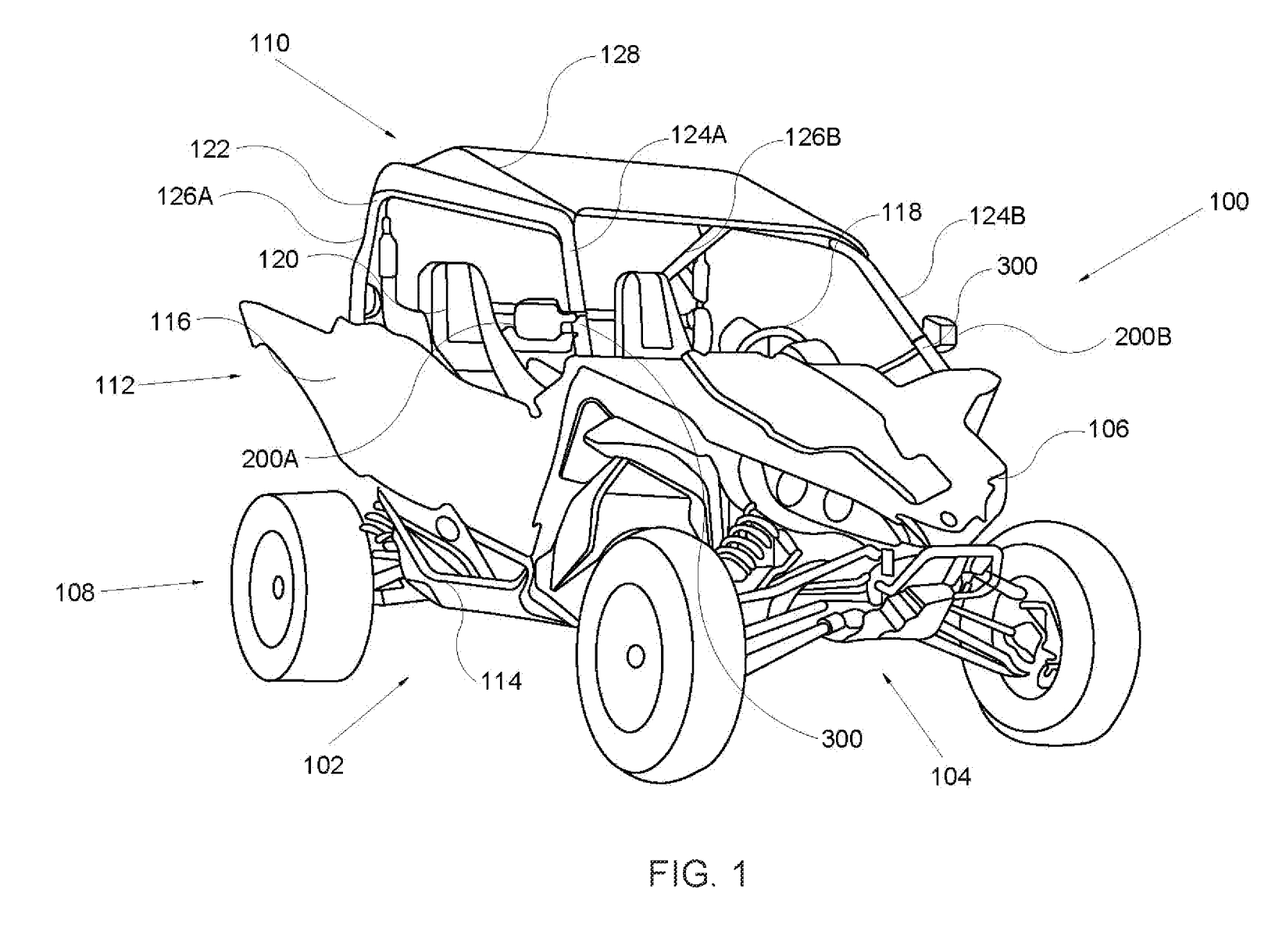
FIG. 1 is a schematic view of an off-road vehicle having a bracket assembly, according to an embodiment of the present disclosure.

Referring to FIG. 1, a perspective view of an off-road vehicle 100 is illustrated. According to an aspect of the present disclosure, the off-road vehicle 100 may be a side-by-side All-Terrain Vehicle (ATV) configured to drive on different terrains including, but not limited to, paved surfaces, off-paved surfaces, gravel surfaces, deep water surfaces, sand surface, and mud surfaces. In various other aspects, the off-road vehicle 100 may also include Utility Task Vehicles (UTV), off-highway vehicles, off-road motorcycles, etc. The off-road vehicle 100 may be subjected to high impact loads and vibrational forces while travelling on the terrains. High impact loads and vibrational forces may be increased when the off-road vehicle 100 is travelling on rough terrains, for example, hilly terrain.

The off-road vehicle 100 includes a plurality of ground engaging members 102 to propel the off-road vehicle 100 on terrains. The plurality of ground engaging members 102 may include a pair of front wheels 104 at a front end 106 and a pair of rear wheels 108 at a rear end 110 of the off-road vehicle 100. The off-road vehicle 100 further includes a frame assembly 112 supported on the ground engaging members 102. The frame assembly 112 includes a chassis 114 and a cab 116 mounted on the chassis 114. The chassis 114 supports an engine and a drivetrain (not shown) of the off-road vehicle 100. The cab 116 includes a steering 118 to steer the off-road vehicle 100 and a pair of seating surfaces 120 to support the sitting drivers.

The frame assembly 112 further includes a protective cage 122 extending over the cab 116. The protective cage 122 is configured to prevent injuries to passengers by absorbing impact forces generated from passing branches or tree limbs, as well as act as a support in events of a vehicle rollover. The protective cage 122 includes a pair of front tubular columns 124 at the front end 106 and a pair of rear tubular column 126 at the rear end 100. The front tubular columns 124 and the rear tubular columns 126 extend upwardly to define entry and exit of the cab 116 for the driver and passengers. The front tubular columns 124 include a first front tubular column 124A and a second front tubular column 124B on opposing lateral ends of the off-road vehicle 100. The rear tubular columns 126 include a first rear tubular column 126A and a second front tubular column 126B on opposing lateral ends of the off-road vehicle 100. The protective cage 122 further includes a roof 128 mounted on the front tubular columns 124 and the rear tubular columns 126. The roof 128 is configured to block weathering elements such as wind, rain, and snow from entering the cab.

The off-highway vehicle further includes two rear-view mirror assemblies 200 mounted to the two front tubular columns 124. The rear-view mirror assemblies 200 allow the driver to view objects behind the off-road vehicle 100. The rear-view mirror assemblies 120 include a first rear-view mirror assembly 200A pivotally mounted to the first front tubular column 124A and a second rear-view mirror 200B pivotally mounted to the second front tubular column 124B. For explanation purposes, the present invention will be explained with respect to the first rear-view mirror assembly 200A only since the structure and operation of the first rear-view mirror assembly 200A is similar to the structure and operation of the second rear-view mirror assembly 200B. For ease of explanation, the term 'first rear-view mirror assembly 200A' will be interchangeably referred to as 'the rear-view mirror assembly 200' and the term 'first tubular column 124A' will be interchangeably referred to as 'the tubular column 124', hereinafter.

Figure 2:
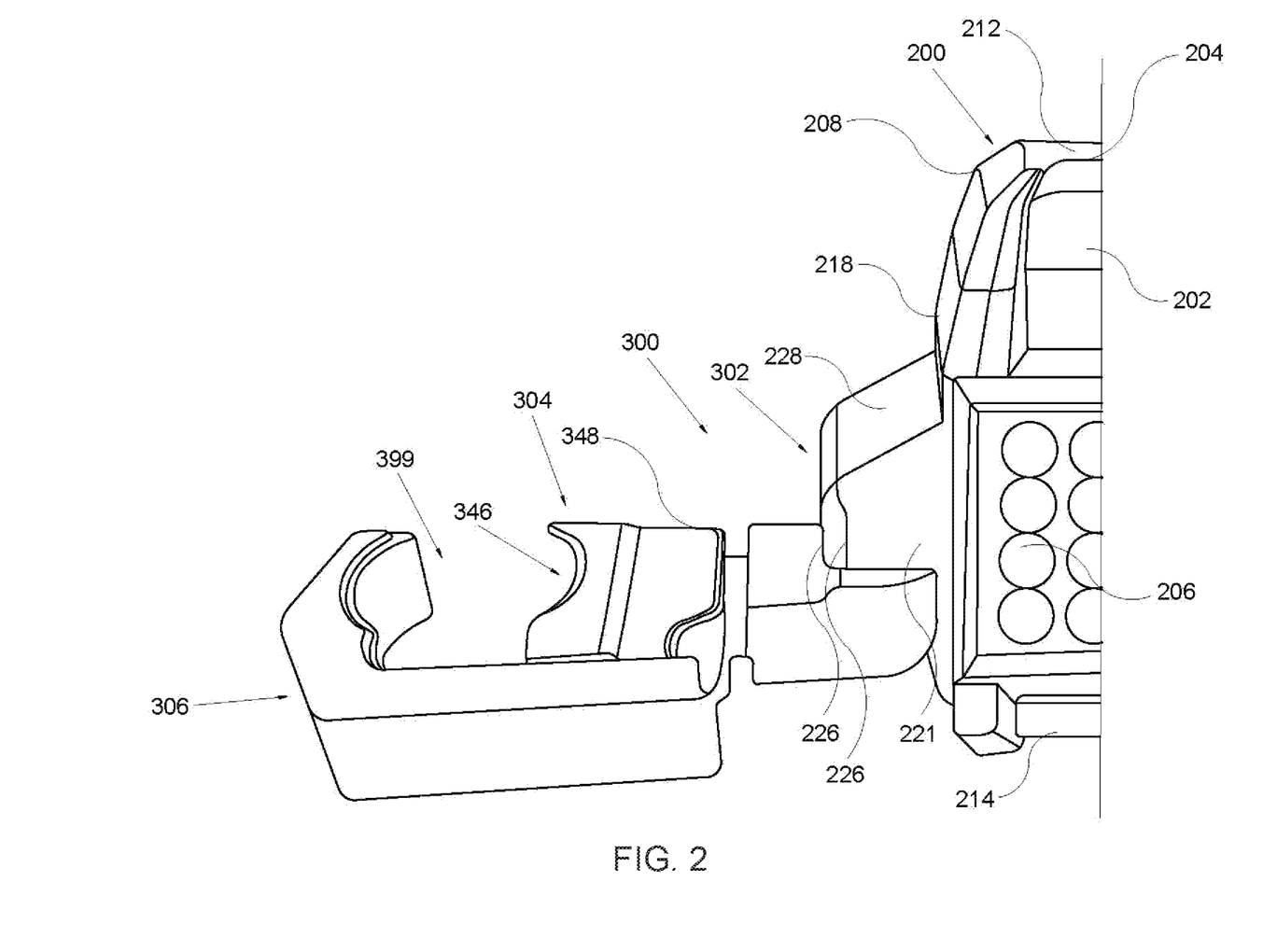
FIG. 2 is a perspective view of the bracket assembly, according to an embodiment of the present disclosure.

FIG. 2 illustrates an enlarged view of the portion A-A in FIG. 1, showing the rear-view mirror assembly 200. The rear-view mirror assembly 200 includes a mirror 202 having a reflecting element (not shown) and a mirror shell 204 for housing the mirror element 202. The mirror shell 204 includes a front face 206, a rear face 208, and a plurality of side faces 210 extending between the front face 206 and the rear face 208. The plurality of side faces 210 includes a top face 212, a bottom face 214, a first side face 216, and a second side face 218. The first side face 216 and the second side face 218 extend between the top face 212 and the bottom face 214 on opposing lateral ends of the mirror shell 204. The front face 206 defines an opening for receiving the mirror element. The rear face 208 defines multiple openings (not shown) for receiving auxiliary head lamps 220 (shown in FIG. 1). The first side face 216 further has an opening (not shown) for receiving an indicator light 222 signaling a left turn movement of the off-road vehicle 100.

The mirror shell 204 further includes a connecting portion 224 extending from the second side surface 218. The connecting portion 224 may be attached or integral to the second surface 218. The connecting portion 224 has three wall elements 226 and a top cap 228 detachably mounted onto the wall element 226. The connecting portion 224 includes a socket 230 defining a recess surface 232 (shown in FIG. 3) extending between the wall elements 226 and the second side face 218. In an embodiment, the recess surface 232 (shown in FIG. 3) has a concave hemi-spherical shape. The connecting portion 224 further includes a connecting through-hole 234 extending to the recess surface 232.

The rear-view mirror assembly 200 further includes a bracket assembly 300 configured to mount the mirror 202 pivotally and robustly to the tubular column 124. The bracket assembly defines a central axis X-X and a vertical axis Y-Y perpendicular to the central axis X-X. The bracket assembly 200 includes a mirror clamp part 302, a base support part 304, and a frame clamp part 306. The mirror clamp part 302 is configured to couple with the mirror shell 204. The base support part 304 is configured to support the mirror clamp part 302 and the frame clamp part 306. The frame clamp part 306 is configured to couple with tubular column 124 to mount the mirror shell 204 to the tubular column 124.

Figure 3:
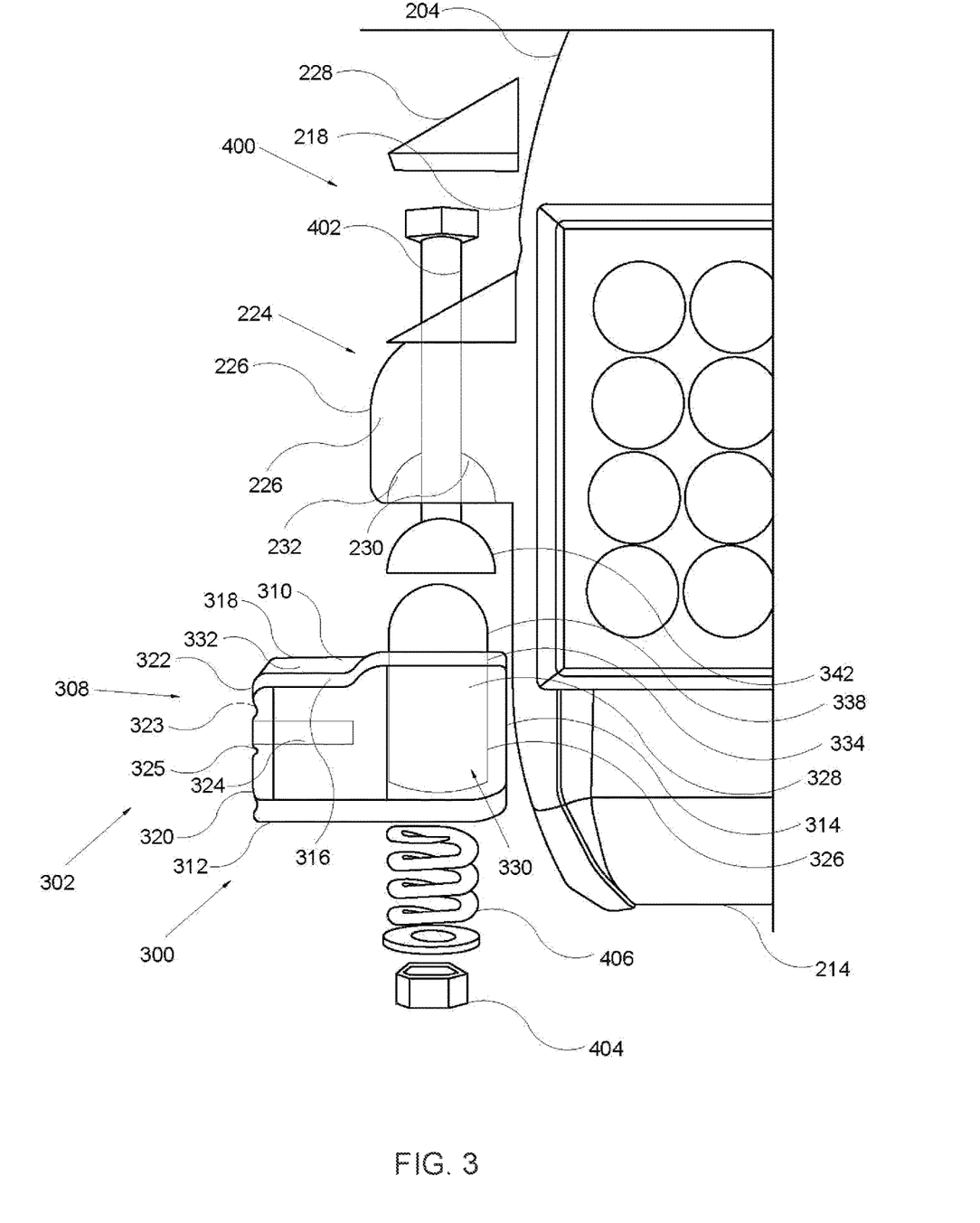
FIG. 3 shows another exploded view of the bracket assembly showing a mirror clamp part attachable to the rear-view mirror, according to an embodiment of the present disclosure.

FIG. 3 illustrates an exploded view of the bracket assembly 300 showing the mirror clamp part 302 attachable to the mirror casing 204. The mirror clamp part 302 includes a body 308. The body 308 includes a top surface 310, a bottom surface 312 opposite to the top surface 310. The body also includes a circumferential surface 314 and a pair of planar side surfaces 316, 318 extending on opposing ends. The body further includes a first engaging surface 320 extending between the planar side surfaces 316, 318. The first engaging surface 320 includes a plurality of first teeth 322 angularly spaced from each other about the central axis X-X. The first engaging surface also defines a first bore 324 extending into the body 308 along the central axis X-X. The tooth 322 has a base 323 and an apex 325 radially distant to the base 323. In an embodiment, the tooth 322 is inclined such that a height of the tooth 322 increases radially outward. Specifically, the base 323 of the tooth 322 has a height greater than a height of the apex 325.

The body 308 of the mirror clamp part 302 further includes a circular inner wall surface 326 and an inner bottom surface 328 opposite to the top surface 310. The circular wall surface 326 and the inner bottom surface 328 defines a recess 330.

The top surface 310 has a planar section 332 adjacent the first engaging surface 320 and a stepped section 334 distal to the first engaging surface 320. The top surface 310 also has an intermediate inclined section 336 extending between the stepped section 334 and the planar section 332. The mirror clamp part 302 further includes a dome connecting surface 338 extending from the stepped section 334 of the top surface 310. The dome connecting surface 338 extends along the vertical axis Y-Y. In an embodiment, the dome connecting surface 338 has a concave hemi-spherical shape.

The dome connecting surface 338 defines a first through-hole 340 extending downwardly along the vertical axis Y-Y' to the recess 330.

During assembly, the dome connecting surface 338 is configured to be received within the socket 230 of the mirror shell 204. In an embodiment, the dome connecting surface 338 has a concave hemi-spherical shape confronting with the convex hemi-spherical shape of the recess surface 232 of the socket 230 to form a ball and socket swivel joint. The dome connecting surface 338 allows pivotal adjustment of the mirror shell 204 with respect to the mirror clamp part 302 about the central axis X-X and the vertical axis Y-Y. Specifically, the dome connecting surface 338 allows a range of angular movement of the mirror 202 thereon to adjust position of the mirror element based on requirements, such as driver height, driver seating positions, etc. In an embodiment, bracket assembly 300 may also include a gasket 342 disposed between the dome connecting surface 338 and the recess surface 232 of the mirror connecting portion 224. In an embodiment, the gasket 342 may be configured to reduce or damp vibrations from propagating to the mirror shell 202. Additionally, the gasket 342 may be configured to seal junction between the dome connecting surface 338 and the socket surface 232.

The bracket assembly 300 further includes a first tightening mechanism 400 for selectively varying an impact force required to rotate the mirror 202 with respect to the mirror clamp part 302. Specifically, the first tightening mechanism 400 is configured to adjust a predetermined frictional resistance to pivotal movement of the mirror 202 onto the dome 332 based on an application of the off-road vehicle 100 and/or driving conditions, including terrains. The first tightening mechanism 400 includes a first bolt 402 received through the connecting through-hole 234 of the mirror connecting portion 224 and the first through-hole 340 of the dome 332, to couple the mirror clamp part 302 with the mirror 202. The first bolt 402 extends through the first through-hole 340 into the recess 330 of the mirror clamp part 302.

The first tightening mechanism 400 also includes a first locking nut 404 configured to secure the first bolt 402 in the recess 330 of the mirror clamp part 302. The first locking nut 404 may be threadably engage with the first bolt 402. The first tightening mechanism 400 further includes a first biasing member 406 disposed between the first locking nut 404 and the mirror clamp part 302. In an embodiment, the first biasing member 406 is mounted between the inner bottom surface 328 of the mirror clamp part 302 and a washer 408 of the first locking nut 404. The first biasing member 406 loads the first locking bolt 402 for applying a biasing force onto the dome connecting surface 338 into engagement with the recess surface 232 of the socket 230. The biasing force of the first biasing member 406 may be adjusted by rotating the first locking nut 404 on the first bolt 402. In an embodiment, the biasing forces may be adjusted to obtain a predetermined frictional resistance to pivotal movement of the mirror 202 onto the dome connecting surface 338 of the mirror clamp part 302, to select a predetermined impact force required for rotating the mirror 202. The predetermined impact forces may be selected based on the application or the driving conditions of the off-road vehicle 100.

Figure 4:
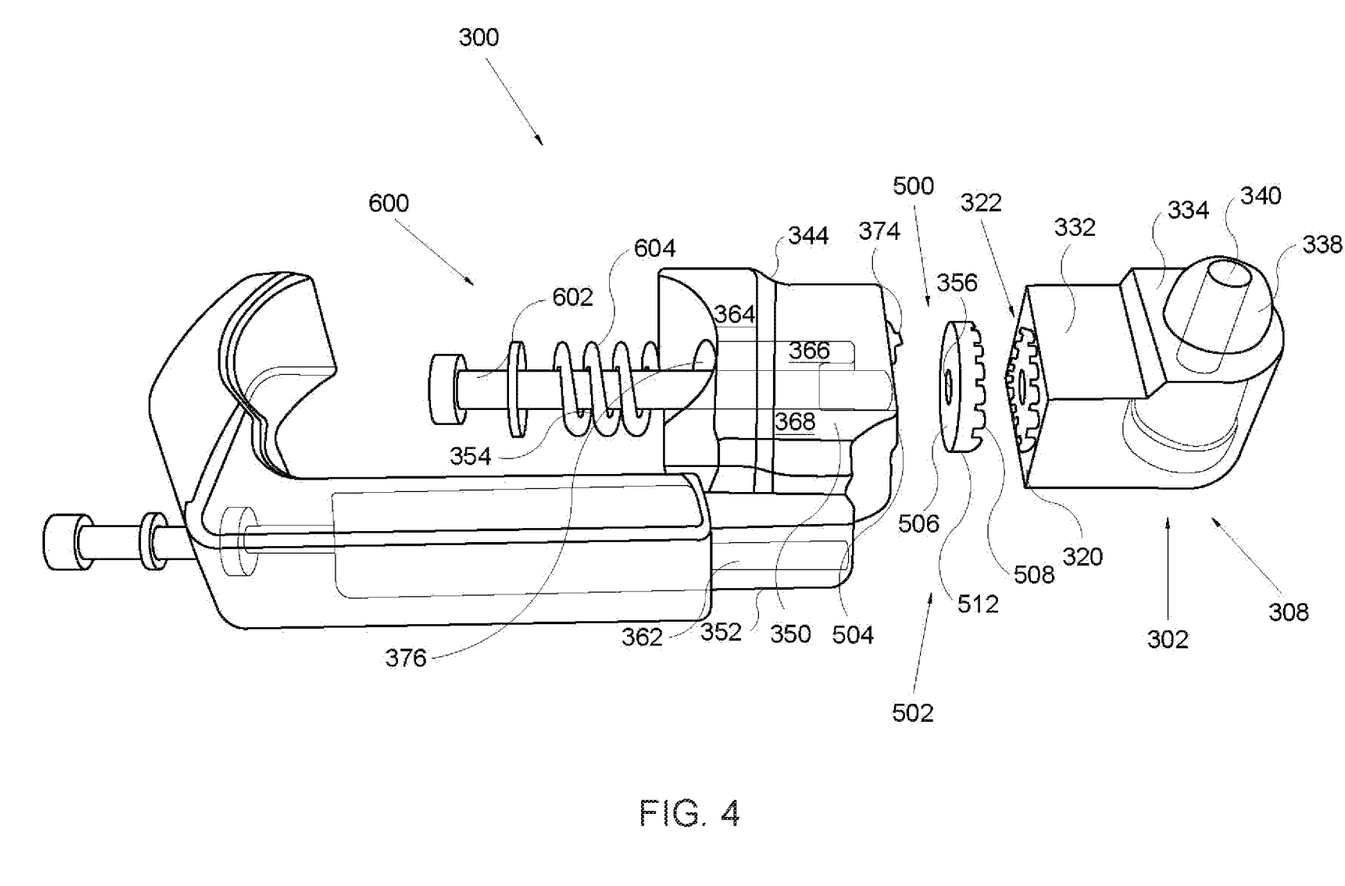
FIG. 4 shows another exploded view of the bracket assembly showing a disk member coupled to the mirror clamp part, according to an embodiment of the present disclosure.

FIG. 4 shows an exploded view of the bracket assembly 300. The base support part 304 includes a body 344 having a first end 346 and a second end 348. The body 344 has a top surface 350, a bottom surface 352 opposite to the top surface 350. The top surface 350 includes a stepped section 364 at the first end 346, a planar section 366 at the second end and an intermediate section 368. The body 344 further includes a front surface 358 and a rear surface 360 extending between top surface 350 and the bottom surface 352 on a front end 370 and a rear end 372, respectively, of the body 344. The base support part 304 includes a sliding track 362 extending from the front surface 358. The sliding track 362 has an upper surface 362A, a lower surface 362B, and a plurality of side surfaces 362C (shown in FIG. 6).

The body 344 further includes a first curvilinear surface 354 at the first end. The first curvilinear surface 354 extends between the stepped section 364 of the top surface 350 and the bottom surface 352. The body 344 also includes a second engaging surface 356 extending between the planar section 366 of the top surface 350 and the bottom surface 352 at the second end. The second engaging surface 356 includes a plurality of projections 374 angularly spaced from each other about the central axis X-X. In the illustrated embodiment, the second engaging surface 356 includes three projections 374-1, 374-2, 374-2. The body 344 further defines a second through-hole 376 extending between the first curvilinear surface 354 and the second engaging surface 356.

Referring to FIGS. 2 and 4, the bracket assembly 300 includes a disk member 500 configured to couple the mirror clamp part 302 with the base support part 304. The disk member 500 is also configured to allow rotational movement of the mirror clamp part 302 with respect to the base support part 304 about the central axis X-X. Specifically, the disk member 500 fixedly engages with the base support part 304 and rotatably engages with the mirror clamp part 302. The disk member 500 includes an annular body 502 defining an aperture 504 therethrough. The annular body 502 has a front surface 506, a rear surface 508, and an annular surface 512 extending between the front surface 506 and the rear surface 508.

Figure 5A:
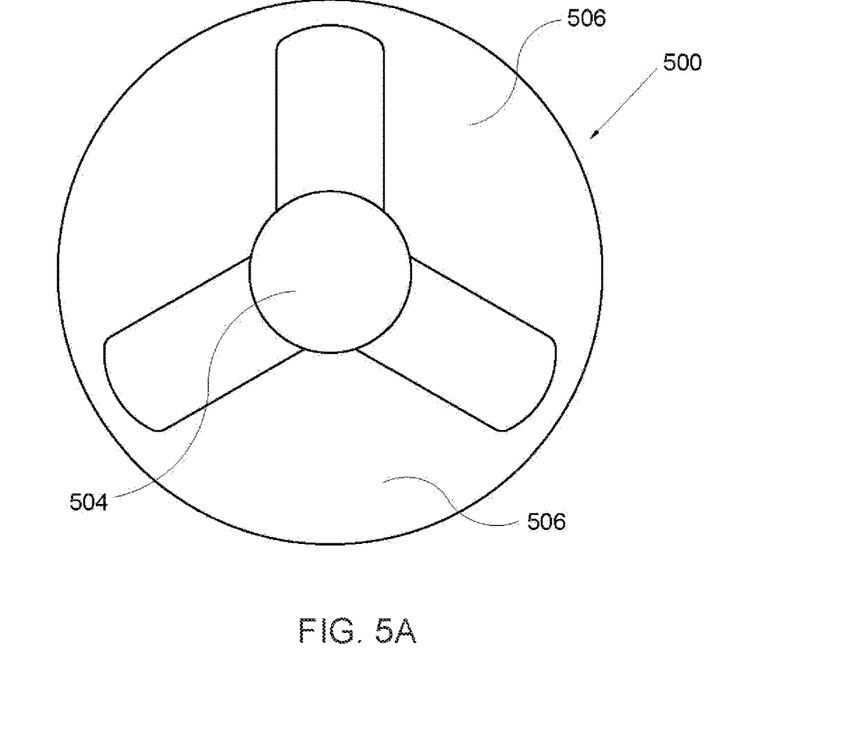
FIG. 5A is a front view of the disk member showing multiple projections, according to an embodiment of the present disclosure.

FIG. 5A shows a front view of the disk member 500. The front surface 506 of the disk member 500 includes a plurality of slots 510 angularly spaced from each other about the central axis X-X. In the illustrated embodiment, the front surface 506 includes three slots 510-1, 510-2, 510-3. In an embodiment, the slots 510 have a uniform width extending radially from the aperture 504 to the annular surface 512. The slots 510 extend from the aperture 504 to a radial distance 'It' within the front surface 506 such that a thickness material is disposed between the slot 510 and the annular surface 512.

Figure 5B:
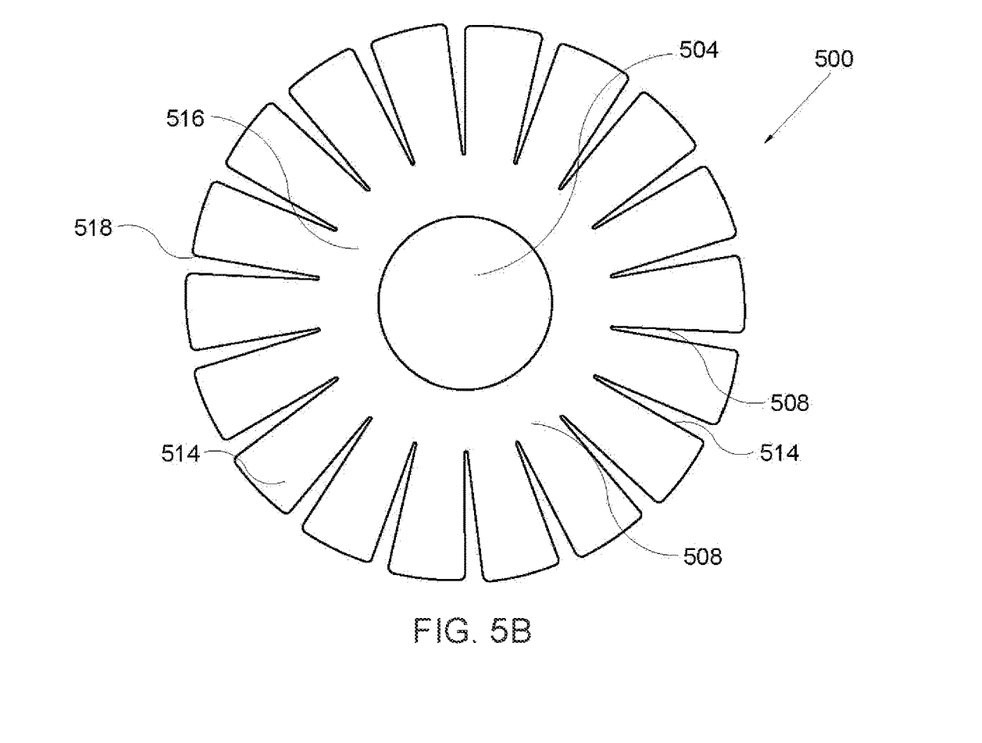
FIG. 5B is a rear view of the disk member showing a plurality of second teeth, according to an embodiment of the present disclosure.

FIG. 5B shows a rear view of the disk member 500. The rear surface 508 of the disk member 500 includes plurality of second teeth 514 angularly spaced from each other about the central axis X-X. The tooth 514 has a base 516 adjacent the aperture 504 and an apex 518 radially distant from the aperture 504. In an embodiment, the tooth 514 is inclined such that a height of the tooth 54 increases radially outward. Specifically, the base 516 of the tooth 514 has a height greater than a height of the apex 518.

Referring to FIGS. 4 and 5A, the disk member 500 is configured to align with the base support part 304 to coaxially align the aperture 504 with the second through-hole 376. Further, the slots 510 of the disk member 500 are configured to receive the projections 374 of the second engaging surface 356, to couple the disk member 500 with the base support part 304. In an embodiment, the slots 510 have a rectangular shape confronting to rectangular shape of the projections 374 of the second engaging surface 354 such that the disk member 500 is fixedly coupled to the base support part 304.

Referring to FIGS. 4 and 5B, the disk member 500 is configured to align with the mirror clamp part 302 to coaxially align the aperture 504 with the first bore 324. To engage the disk member 500 with the mirror clamp part 302, the second teeth 514 of the disk member 500 are configured to mesh with the first teeth 322 of the mirror clamp part 302. Specifically, when the first teeth 322 and the second teeth 514 are fully meshed, the apexes 325 of the first teeth 322 engage the base 516 of the second teeth 514 and the apexes 518 of the second teeth 514 engage the base 323 of the first teeth 322 since the first teeth 322 and the second teeth 514 are inclined. The first teeth 322 are further configured for sliding up over the apexes 518 and down the fixed second teeth 514, when the mirror clamp part 302 is rotated in either forward or backward direction about the central axis X-X.

Now referring to FIG. 4 only, the bracket assembly 300 further includes a second tightening mechanism 600 for selectively varying an impact force required to rotate the mirror clamp part 302 with respect to the disk member 500 about the central axis X-X. Specifically, the second tightening mechanism 600 is configured to adjust a predetermined frictional resistance to pivotal movement of the mirror clamp part 302 with respect to the disk member 500, based on an application of the off-road vehicle 100 and/or driving conditions, including terrains. The second tightening mechanism 600 includes a second bolt 602 configured to couple the mirror clamp part 302 with the disk member 500 and the base support part 304. The second bolt 602 is received into the second through-hole 376 and the first bore 324 of the mirror clamp part 302 through the aperture 504 of the disk member 500. In an embodiment, the second bolt 602 may include threads configured to engage with threads of the first bore 324.

The second tightening mechanism 600 further includes a second biasing member 604 disposed between the second bolt 602 and the base support part 304. In an embodiment, the second biasing member 604 is disposed between the first curvilinear surface 354 and the second bolt 602 to apply biasing forces on the base support part 304, and thereby pushing the disk member 500 into engagement with the mirror clamp part 302. Specifically, the second biasing member 604 biases the second teeth 514 of the disk member 500 into mesh with the first teeth 322 of the first engaging surface 320. The biasing force of the second biasing member 604 is adjusted by rotating the second bolt 602 into or out of the first bore 324 to selectively vary the impact force required to rotate the mirror clamp part 302 about the central axis X-X. Specifically, rotation of the second bolt 602 into or out of the first bore 324 compresses or relaxes the second biasing member 604 and moves the second teeth 514 into more firm, or less firm, mesh engagement with the first teeth 322 of the clamp support member 302. In an embodiment, the biasing forces may be adjusted to select a predetermined impact force required for rotating the mirror 202 about the central axis X-X. The predetermined impact forces may be selected based on the application or the driving conditions of the off-road vehicle 100.

Figure 6:
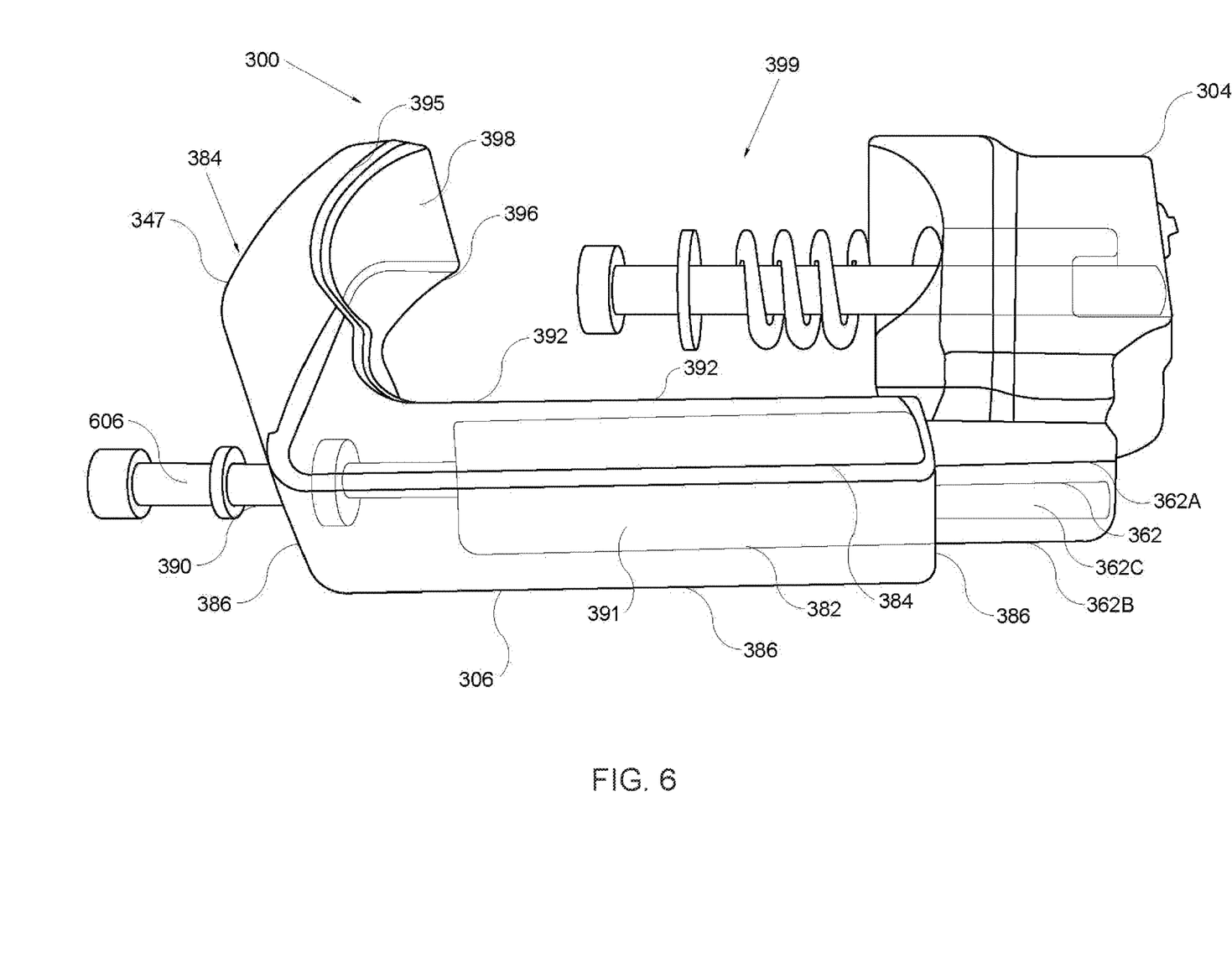
FIG. 6 is a perspective view of a portion of the bracket assembly showing a frame clamp part, according to an embodiment of the present disclosure.

FIG. 6 shows an exploded view of the bracket assembly 300 showing the frame clamp part 308 coupled to the base support part 304. The frame clamp part 380 is slidably coupled to the base support part 304. The frame clamp part 304 includes a linear support portion 382 and a curvilinear clamping portion 384 extending laterally perpendicular from the linear portion 382.

The linear portion 382 includes a top surface 384, a bottom surface 386 opposite to the top surface 384, an end wall surface 386 surface extending between the top surface 382 and the bottom surface 384 at a rear end, a front wall surface 388 extending between the top surface 382 and the bottom surface 384 at an opposing front end. The front wall surface 388 defines a second bore 390 extending into the linear portion 382. In an embodiment, the second bore 390 includes threads. The linear portion 382 further includes a front wall surface 391, and a rear wall surface 392 surface opposite to the front wall surface 392. The rear wall surface 394 defines a sliding channel 393 along a length of the linear potion 382. The sliding channel 393 is configured to receive the sliding track 362 of the base support part 304 to allow translation of the frame clamp part 306 with respect to the base support part 304 along the central axis X-X.

The curvilinear portion 384 extends laterally perpendicular from the first end of the linear portion. The curvilinear portion 384 includes a top surface 395, and a bottom surface 396 opposite to the bottom surface. The curvilinear portion 384 also includes a vertical planar surface 397 and a second curvilinear surface 398 extending between the top surface 395 and the bottom surface 396. The second curvilinear surface 398 extends at a first side facing the base support part 304 and the vertical planar surface 397 extends at a second side opposite to second curvilinear surface 398. The second curvilinear surface 398 defines an opening 399 with the first curvilinear surface 354 of the base support part 304 for receiving the tubular column 124 of the frame assembly 112. The first curvilinear surface 354 and the second curvilinear surface 398 engages with the tubular column 124 to support the mirror 202 onto the off-road vehicle 100.

In an embodiment, the bracket assembly 300 also includes a third bolt 606 configured to be received within the second bore 390 of the linear portion 382 of the frame clamp part 306. The third bolt 606 includes threads engages with threads of the second bore 390. The third bolt 606 selectively secures the frame clamp part 306 to the base support part 304 at a predetermined position. In an embodiment, the third bolt 606 may be turned into the second bore 390 to translate the frame clamp part 306 towards the base support 304 member along the central axis X-X. Further, the third bolt 606 may be turned out of the second bore 390 to translate the frame clamp part 306 onto the sliding track 362 away from the base support part 304 along the central axis X-X. Translation of the frame clamp part 306 causes translation of the second curvilinear surface 398 to select a preselected dimension of the opening 399 for holding the tubular column 124 of the frame assembly 112. In an embodiment, frame clamp part 306 may be translated to change the opening 399 to a preselected diameter based on a model or make of the off-road vehicle 100.

All terminologies used herein is for mere purpose of describing embodiments and examples and should not be construed as limiting the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof

What is claimed is:

1. A bracket assembly for mounting a mirror to a column, the bracket assembly comprising:
   a mirror clamp part having a dome connecting surface along a vertical axis and a first engaging surface along a central axis perpendicular to the vertical axis, the first engaging surface includes a plurality of first teeth angularly spaced from each other about the central axis the mirror having a socket;
   a base support part having a second engaging surface extending along the central axis and a first curvilinear surface opposite to the second engaging surface, wherein the second engaging surface includes a plurality of projections angularly spaced from each other about the central axis;
   a disk member having a plurality of channels configured to receive the projections of the second engaging surface to fixedly couple with the base support part, wherein the disk member includes plurality of second teeth angularly spaced from each other about the central axis; and
   a frame clamp part configured to be coupled with the base support part, the frame clamp part having a second curvilinear surface facing the first curvilinear surface of the base support part to define an opening for receiving the frame,
   wherein the plurality of first teeth is adapted to engage with the plurality of second teeth to allow a rotation of the mirror about the central axis, and wherein the frame clamp part is translatable along the central axis with respect to the base support part to change the opening for receiving the column, and
   wherein frame clamp part includes a sliding channel that slidably engages with a sliding track of the base support to allow translation of the frame clamp part with respect to the base support part.

2. The bracket assembly of claim 1 comprising a first tightening mechanism for selectively varying an impact force required to rotate the mirror with respect to the mirror clamp part, the first tightening mechanism comprising:
   a first bolt configured to couple the mirror clamp part with the mirror;
   a first locking nut configured to secure the first bolt to the mirror clamp part; and
   a first biasing member disposed between the nut and the mirror clamp part to bias the dome connecting surface into engagement with the socket of the mirror, wherein a biasing force of the first biasing member is adjusted by rotating the first locking nut on the first bolt to vary the impact force.

3. The bracket assembly of claim 2 comprising a second tightening mechanism for selectively varying an impact force required to rotate the mirror claiming member about the horizontal axis, the second tightening mechanism comprising:
   a second bolt configured to couple the mirror clamp part with the disk member and the base support part; and
   a second biasing member disposed between the second bolt and the base support part, the second biasing member being configured to bias the plurality of first teeth of the first engaging surface out of the mesh engagement with the plurality of second teeth of the disk member, wherein a biasing force of the second biasing member is adjusted by rotating the second bolt into the second through hole to selectively vary the impact force required to rotate the mirror claiming member about the horizontal axis.

4. The bracket assembly of claim 3, the base support part defines a second through hole extending along the central axis between the first curvilinear surface and the second engaging surface, the second through receives the second bolt to couple the base support part with the mirror clamp part.

5. The bracket assembly of claim 4, wherein the disk member includes an aperture coaxially aligned with the second through hole of the base support part and the first bore of the mirror clamp part, wherein the second bolt is configured to pass the aperture for coupling the disk member with the base support part and the mirror clamp part.

6. The bracket assembly of claim 3, wherein the first engaging surface of the mirror clamp part defines a first bore configured to receive the second bolt to couple the base support part with the mirror clamp part.

7. The bracket assembly of claim 3, wherein the frame clamp part defines a third through hole extending along the central axis to receive a third bolt, the third bolt being configured to couple the frame clamp part with the base support part.

8. The bracket assembly of claim 1, wherein the dome connecting surface defines a first through hole extending along the vertical axis to receive the first bolt.

9. The bracket assembly of claim 1, wherein the dome connecting surface is adapted to be received within a socket of the mirror to adjustably rotate the mirror about the central axis and the vertical axis.

10. The bracket assembly of claim 1, wherein the dome connecting surface of the mirror clamp part has a convex profile and the socket of mirror has a concave profile.

11. The bracket assembly of claim 1 comprising a bushing configured to be received within the socket of the mirror to damp vibrations.

12. A rear-view mirror assembly for an off-road vehicle, the rear-view mirror assembly comprising:
   a mirror shell defining a socket; and
   a mirror clamp part having a dome connecting surface along a vertical axis and a first engaging surface along a central axis perpendicular to the vertical axis, the first engaging surface including a plurality of first teeth, wherein the dome connecting surface engages with the socket of the mirror shell to allow rotation of the mirror shell about the vertical axis;
   a base support part having a second engaging surface extending along the central axis and a first curvilinear surface opposite to the second engaging surface, the second engaging surface including a plurality of projections angularly spaced from each other about the central axis;
   a disk member having a defining a plurality of channels to receive the projections of the second engaging surface to couple with the base support part, the disk member including a plurality of second teeth engageable with the plurality of first teeth of the first engaging surface to allow rotation of the mirror clamp part about the vertical axis;
   a first tightening mechanism for selectively varying an impact force required to rotate the mirror with respect to mirror clamp part, the first tightening mechanism comprising:
      a first bolt configured to couple the mirror clamp part with the mirror;
      a first locking nut configured to secure the first bolt to the mirror clamp part; and a first biasing member disposed between the nut and the mirror clamp part to bias the dome connecting surface into engagement with the socket of the mirror, wherein a biasing force of the first biasing member is adjusted by rotating the first locking nut on the first bolt to vary the impact force;

a second tightening mechanism for selectively varying an impact force required to rotate the mirror claiming member about the horizontal axis, the second tightening mechanism comprising:
a second bolt configured to couple the mirror clamp part with the disk member and the base support part; and
a second biasing member disposed between the second bolt and the base support part, the second biasing member being configured to bias the plurality of first teeth of the first engaging surface out of the mesh engagement with the plurality of second teeth of the disk member, wherein a biasing force of the second biasing member is adjusted by rotating the second bolt into the second through hole to selectively vary the impact force required to rotate the mirror claiming member about the horizontal axis; and a frame clamp part configured to be coupled with the base support part, the frame clamp part having a second curvilinear surface facing the first curvilinear surface of the base support part to define an opening for receiving the frame, the frame clamp part being translatable along the central axis with respect to the base support part to change a diameter of the opening for receiving a frame of the off-road vehicle.

13. The rear-view mirror assembly of claim 12, wherein the frame clamp part defines a third through hole extending along the central axis to receive a third bolt, the third bolt being configured to couple the frame clamp part with the base support part.

14. The rear-view mirror assembly of claim 12, wherein frame clamp part includes a sliding channel that slidably engages with a track of the base support part to allow translation of the frame clamp part with respect to the base support part.

15. The rear-view mirror assembly of claim 12, wherein the dome connecting surface of the mirror clamp part has a convex profile and the socket of mirror has a concave profile.

16. The rear-view mirror assembly of claim 12 comprising a bushing configured to be received within the socket of the mirror to damp vibrations.

17. An off-road vehicle comprising:
a frame having a column;
a mirror shell defining a socket;
a bracket assembly for robustly and pivotally mounting the mirror shell to the column of the frame, the bracket assembly comprising:
a mirror clamp part having a dome connecting surface along a vertical axis and a first engaging surface along a central axis perpendicular to the vertical axis, the first engaging surface including a plurality of first teeth, wherein the dome connecting surface engages with the socket of the mirror shell to allow rotation of the mirror shell about the vertical axis;
a base support part having a second engaging surface extending along the central axis and a first curvilinear surface opposite to the second engaging surface, the second engaging surface including a plurality of projections angularly spaced from each other about the central axis;
a disk member having a defining a plurality of channels to receive the projections of the second engaging surface to couple with the base support part, the disk member including a plurality of second teeth engageable with the plurality of first teeth of the first engaging surface to allow rotation of the mirror clamp part about the vertical axis;
a first tightening mechanism for selectively varying an impact force required to rotate the mirror with respect to mirror clamp part, the first tightening mechanism comprising:
a first bolt configured to couple the mirror clamp part with the mirror;
a first locking nut configured to secure the first bolt to the mirror clamp part; and
a first biasing member disposed between the nut and the mirror clamp part to bias the dome connecting surface into engagement with the socket of the mirror, wherein a biasing force of the first biasing member is adjusted by rotating the first locking nut on the first bolt to vary the impact force;
a second tightening mechanism for selectively varying an impact force required to rotate the mirror claiming member about the horizontal axis, the second tightening mechanism comprising:
a second bolt configured to couple the mirror clamp part with the disk member and the base support part; and
a second biasing member disposed between the second bolt and the base support part, the second biasing member being configured to bias the plurality of first teeth of the first engaging surface out of the mesh engagement with the plurality of second teeth of the disk member, wherein a biasing force of the second biasing member is adjusted by rotating the second bolt into the second through hole to selectively vary the impact force required to rotate the mirror claiming member about the horizontal axis; and
a frame clamp part configured to be coupled with the base support part, the frame clamp part having a second curvilinear surface facing the first curvilinear surface of the base support part to define an opening for receiving the frame, the frame clamp part being translatable along the central axis with respect to the base support part to change a diameter of the opening for receiving a column of the vehicle.

18. The off-road vehicle of claim 17, wherein frame clamp part includes a sliding channel that slidably engages with a track of the base support part to allow translation of the frame clamp part with respect to the base support part, and wherein the dome connecting surface of the mirror clamp part has a convex profile and the socket of mirror has a concave profile.

19. The off-road vehicle of claim 17 comprising a bushing configured to be received within the socket of the mirror to damp vibrations.

* * * * *